United States Patent [19]

Åke

[11] Patent Number: 4,952,187
[45] Date of Patent: Aug. 28, 1990

[54] METHOD FOR THE MANUFACTURE OF COMPACT LOW-PRESSURE MERCURY DISCHARGED LAMP

[75] Inventor: Björkman Åke, Karlskrona, Sweden
[73] Assignee: Lumalampan Aktiebolag, Sweden
[21] Appl. No.: 389,993
[22] Filed: Aug. 7, 1989

Related U.S. Application Data

[63] Continuation of Ser. No. 196,865, May 19, 1988, abandoned, which is a continuation-in-part of Ser. No. 865,045, May 19, 1986, abandoned.

[30] Foreign Application Priority Data

May 23, 1985 [SE] Sweden .................................. 8502561

[51] Int. Cl.$^5$ .................................................. H01J 9/24
[52] U.S. Cl. ........................................ 445/22; 445/26; 65/109; 313/493
[58] Field of Search ................... 445/22, 26; 85/109, 85/108; 313/493, 491

[56] References Cited

U.S. PATENT DOCUMENTS

| | | | |
|---|---|---|---|
| 2,228,327 | 1/1941 | Spanner | 313/565 |
| 2,262,177 | 11/1941 | Germer | 313/565 |
| 2,965,778 | 12/1960 | Jenkins | 313/493 |
| 3,897,233 | 7/1975 | Szilagy | 65/109 |
| 3,988,633 | 10/1976 | Shurgan et al. | 313/493 |
| 4,582,523 | 4/1986 | Marcucci et al. | 65/109 |
| 4,825,125 | 4/1989 | Lagusherko | 313/493 |

FOREIGN PATENT DOCUMENTS 367162  2/1990  Japan .

Primary Examiner—Kenneth J. Ramsey
Attorney, Agent, or Firm—Roylance, Abrams, Berdo & Goodman

[57] ABSTRACT

A compact low-pressure mercury vapour discharge lamp comprises two or more straight tubes which are interconnected at their ends to form one discharge chamber between two electrodes located in the outermost ends of the lamp. These ends are connected in a gas-tight manner to a lamp base incorporating the requisite contact pins and conductors. Down stream of the electrodes in the direction of the discharge current are tube constrictions which define spaces around the electrodes in which released ions from the electrode emission material are held concentrated, so as to fall back onto the electrode surface upon each change in current phase. The invention includes a method including several specific operating parameters, for making the glass envelope of the invention lamp.

10 Claims, 1 Drawing Sheet

METHOD FOR THE MANUFACTURE OF COMPACT LOW-PRESSURE MERCURY DISCHARGED LAMP

This is a continuation of application Ser. No. 07/196,865 filed May 19, 1988, which is a continuation-in-part of application Ser. No. 06/865,045 filed on May 19, 1986, both of which are now abandoned.

The present invention relates to a so-called compact low-pressure mercury vapour discharge lamp, i.e. a gas discharge lamp comprising two or more mutually parallel tubes which are joined together in the proximity of their ends to form a common discharge chamber between two electrodes placed in the mutually opposite, furthest ends of the discharge chamber. These ends are connected in a gas-tight manner to a common lamp base which incorporates a starter or ignition means and the requisite series impedance systems, and is provided with connection pins for the supply of electrical current.

The invention includes a method for the manufacture of such a compact gas discharge lamp.

Many kinds of compact low-pressure mercury vapour discharge lamps are known to the art. Of these many known designs, there are two constructions which dominate in the case of lamps comprising solely two straight tubes. A first of these constructions can be most easily described as being of inverted U-shape with the lamp electrodes located in the free ends of the tube, these free ends being attached to a common lamp base. The second of these lamps has a substantially H-shaped configuration, with the horizontal bridge placed at a very high location between the two verticals. In this lamp, the electrodes are arranged in the tube ends located furthest from the bridge. The ends of the tubes in which the electrodes are located are also fitted to a common lamp base, which incorporates a starter or ignition means and series impedance systems. The tubes of both these designs are coated internally with a luminescent powder of any desired composition. This luminescent powder converts the ultra-violet light rays produced by a discharge into visible light.

Those compact low-pressure mercury discharge lamps which incorporate more than two straight tubes normally comprise four tubes. These tubes may be located in a single plane, or may be placed in the corners of a square, forming an imaginary cross-section at right angles to the symmetry axes of the tubes. Cross-coupling between the straight tubes is effected alternately between the tube ends located furthest away from the lamp base and the tube ends located nearest said base. Only the first and the last tubes are connected to the lamp base, and it is in these ends of the base-connected tubes that the electrodes are arranged. In this way there is formed a continuous discharge chamber through which the electric current passing between the electrodes flows when the lamp is energized. The fact that the electric current is forced to change direction when passing from one tube to another, via an interconnecting tube, has no essential significance with respect to luminous efficiency, provided that the coupling tube has a smaller diameter than the straight tubes.

In compact low-pressure mercury vapour discharge lamps, as with other low-pressure gas discharge lamps, there is formed between the electrodes a positive column of light arc which passes through a rare gas mixed with mercury vapour. The gas pressure in a compact lamp is held beneath 500 Pascal (Pa), and at operating temperatures the mercury partial pressure constitutes less than 1 Pa of this value.

The function of the rare gas is to facilitate lamp ignition at a reasonable starting voltage, and to increase the probability of collision between the electrons and mercury atoms when the lamp is energized. The low mercury vapour pressure prevailing at 40° C. provides the optimum for producing the mercury resonance lines, which lie within the ultraviolet range, namely at 253.7 and 185 nanometers (nm). Of the light thus produced the longer wavelength is responsible for 85% of the intensity, whereas the shorter wavelength constitutes 15%. If a low-pressure mercury vapour discharge lamp contained solely mercury vapour, the electrons would collide practically solely with the tube walls and mercury atoms. That is, in the absence of luminescent powder, the electron energy would be converted into heat and not into light.

A compact low-pressure mercury vapour discharge lamp of the aforedescribed H-configuration and a method for its manufacture is described in EP-A-0094133 (Application No. 83200640.7). The object of the invention described in that publication is to enable the ends of the straight tubes in whose vicinity the interconnecting tube therebetween is to be formed in a later manufacturing stage to be reliably closed. Although not expressly stated, a further object is to cool the thin transitions between the straight tubes and the aforesaid end surfaces thereof with the aid of ambient air, to an extent such that condensation of mercury enclosed in the luminescent lamp takes place at said transition regions. There is maintained in this way a balanced mercury vapour pressure in the lamp, since no heat generating discharge takes place in the ends of the straight tubes beyond the transverse interconnecting tube.

A prime object of the present invention is to provide a compact low-pressure mercury vapour discharge lamp of such a nature that the mercury partial pressure in the discharge chamber, when the lamp is energized, is maintained at a level which provides maximum effect with respect to the radiation generated by the discharge at the mercury resonance lines.

A further object is to screen the lamp electrodes so as to limit the extent to which heat generated thereby propagates. The present invention provides that the temperature of a major part of the straight tubes at the ends thereof located furthest from the lamp base will not exceed 40° C.

This is of particular importance when such compact low-pressure mercury vapour lamps are placed in lamp fittings provided with reflectors or in globes. When the lamps are housed in lamp fittings of this nature, the heat emitted by the lamps is not adequately dissipated and temperatures in excess of 40° C. occur within the lamps. This causes the mercury vapour pressure in the lamp to rise, resulting in a lower intensity in the generation of radiation in the mercury resonance lines.

These objects are achieved in accordance with the teachings of the present invention.

The invention is based on the concept that in a discharge chamber in the embodiment used in compact low-pressure mercury vapour lamps the negative space charge is concentrated at the tube walls and a positive column is formed between the electrodes with the space charge 0 along its axis. The discharge between the cathode and anode regions is unitary in the axial direction, at each moment following ignition of the lamp. Positive ions and electrons are formed simultaneously with the discharge. These are concentrated at the tube walls by diffusion. Since the column is axially unitary, no particle losses are experienced in the axial direction. During this diffusion process, the electrons move much more rapidly than the positive ions, due to the smaller mass of the electrons, and hence a positive space charge is developed from the centre of the tube outwardly. This improves conditions for discharge in the positive column, and therewith increases the power in the ultraviolet radiation.

The method applied to limit the propagation of heat from the electrodes involves pinching or constricting the straight tubes at a location downstream of the electrodes. It is found that the useful life span of a luminescent lamp is surprisingly increased manifold as a result of this measure. It has been established that the reason for this is that a pinched or constricted area in the glass tubes downstream of the electrodes in the path of the discharge current results in an increase in electron density during the half period in which the electrode functions as an anode. As a consequence, the anode drop is reduced, which results in a lower temperature of the emission material with which the electrode is coated. This decrease in temperature lowers the rate of vaporization of the emission material, which results in an increase in the useful life span of the electrode and, of course, a corresponding life increase of the compact low-pressure mercury vapour discharge lamp.

One importance contribution to this increase in the useful life span of the electrodes is the reflection of vaporized emission material taking place from the constricted space around the electrodes, this space being defined by the constricted area of the glass tube downstream of the electrodes. The possibility of the emission-material ions released from the electrode surface during one half period moving in the axial direction of the positive column formed in the lamp is extremely restricted. The constricted region of the glass tube causes the positive column to be compressed radially, whereby only a minimal negative space charge prevails along the tube wall in the region of the pinched or constricted area. As a result, the released ions remain in the constricted space nearest the electrode, and fall back onto the electrode surface during the next half period.

The ions released from the emission material have a far greater mass than the electrons around the electrode and therefore move much more slowly. Consequently, the ions do not reach the tube wall to any appreciable extent before the discharge current changes direction, and do not therefore precipitate onto the glass wall of the tube, which would otherwise be blackened.

In addition to the constriction formed at the pinched region of the tube wall resulting in reflection of the emission material, and therewith greatly restricting its degradation, the constriction also diminishes the occurrence of ions from the emission material in the discharge chamber. Since a part of this chamber can be maintained at a temperature of 40° C., the mercury vapour pressure will be beneath 1 Pa, or approximately $5 \times 10^{-3}$ torr, which is the pressure at which the relative efficiency for the generation of resonance radiation in mercury vapour from a light arc is maximum. At lower mercury partial pressure the mercury atoms are spaced too widely apart, resulting in fewer collisions between the atoms and electrons and hence also in fewer excited photons or a lower intensity in the ultraviolet radiation. At higher mercury vapour partial pressures, the mercury atoms are so dense that the number of collisions becomes excessive and electrons rebound, which also results in fewer excited photons.

The low ion content from the emission material thus results in the loss of but very few electrons through collision with such ions. Thus, a large number of electrons collide with mercury atoms, resulting in high efficiency, i.e. a high luminous efficiency for each Watt applied. Measurements have shown that the luminous flux of a compact low-pressure mercury vapour discharge lamp according to the invention is 3.5 times per Watt greater than that achieved with prior art lamps of this kind.

The invention also includes a method for the manufacture of the specially formed glass tubes or envelopes which house lamps made in accordance with the invention. This method includes a range of values for each of several operating parameters; including the speed of rotation of the glass tube in a lathe, the temperature of the glass tube at the heated zone, the temperature of the flame used to produce this heated zone where the constriction is to be formed, the particular tools used to form the constrictions, and the speed of their application to the heated zone of the glass tube.

A preferred embodiment of a compact low-pressure mercury vapour discharge lamp and a method for its manufacture will now be described with reference to the accompanying drawing, in which FIG. 1 is a partly cut-away view of a compact low-pressure mercury vapour discharge lamp embodying the invention;

Figure 1:
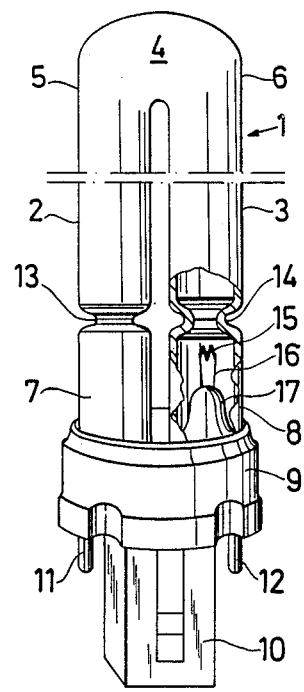

The compact luminescent lamp 1 comprises two straight tubes 2, 3 which are coated internally with a luminescent powder of the two or three band type, and an interconnecting tube 4 which joins the tubes 2, 3 together and which is located at first ends 5, 6 of the straight tubes. The other, or second, ends 7, 8 of the straight tubes are connected gas-tight to a lamp base 9 which is common to said tubes. The lamp base is provided on the end thereof remote from the tubes 2, 3 with a housing 10 of rectangular cross-section which contains a starter and a series impedance system. Located on both sides of the housing 10 are contact pins 11, 12 through which current is supplied to the lamp 1.

The tubes 2, 3 are pinched in the proximity of their second ends 7, 8 so as to form constrictions 13, 14. For example, with an internal tube diameter of 10 mm, the internal diameter of the pinched region may be 4 mm. In this way there is defined at the second end 8 of the tube 3 a space within which an electrode 15 is arranged. This electrode is supported by two electrical conductors 16 which are fused into a stem 17 and which are in contact with the contact pin 12 and the starter in the housing 10. Corresponding components are arranged in the second end 7 of the tube 2.

The lamp is normally filled with the rare gas argon to a pressure of roughly 3 torr. If the diameter of the constrictions 13, 14 is decreased, the glow potential of the lamp will increase, which is not desired. It has been found that this tendency can be overcome by adding krypton to the rare gas filling. Since krypton is very expensive, it is desirable to hold the amount charge to a minimum. Although krypton additions of between 50 and 90% have been found to provide a noticeable effect, higher quantities in the rare gas filling do not mean that the diameters of the constrictions 13, 14 can be further decreased.

The pinched or constricted region 14 provides around the electrode 15 a space in which ions, primarily barium ions released from the electrode emission material, are present in relatively high concentrations. As a result of the constriction 14, the positive column formed between the two electrodes of the lamp fully fills the cross-sectional area of the tube 3 at the location of said constriction. This has a pronounced negative effect on the possibility of the ions released from the emission material leaving the space around the electrode 15. When the current changes phase in the next half period, practically all of these ions fall back onto the surface of the electrode 15, whereby the electrode 15 remains operationally serviceable for at least 15,000 hours.

The method applied in manufacturing the compact low-pressure mercury vapour discharge lamp 1 can be described as follows.

Figure 2:
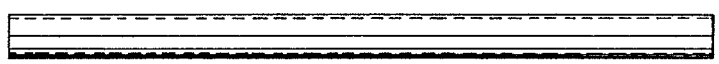
FIG. 2 illustrates a straight glass tube, which constitutes a starting component in the manufacture of the lamp of FIG. 1.
Figure 3:
FIG. 3 illustrates the tube when coated internally with luminescent powder.
Figure 4:
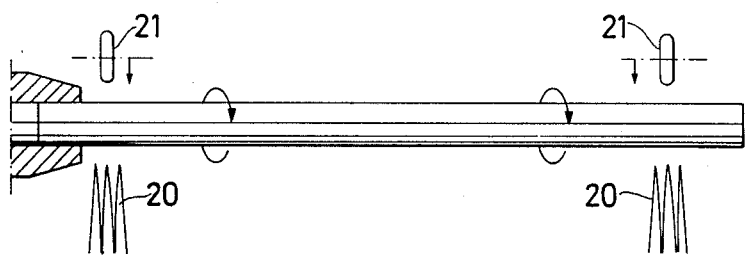
FIG. 4 illustrates the tube when ready to be provided with pinched or constricted regions.
Figure 5:
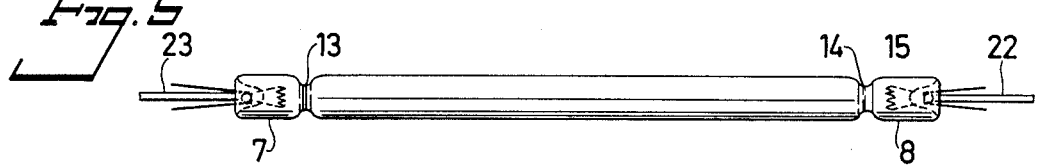
FIG. 5 illustrates the glass tube when provided with pinched regions, electrodes and pump pipes.

Manufacture is commenced from a straight glass tube of standard quality having, for example, an outer diameter of 12 mm and an inner diameter of 10 mm (FIG. 2). The tube is coated internally in a known manner with a fluorescent powder containing fluorescent substances of any desired composition. The powder is then burned-off to form a stable fluorescent layer (FIG. 3). The glass tube is then placed in a glass lathe and rotated, while applying gas flames 20 to region of the tube close to the ends thereof, these ends in a completed compact luminescent lamp forming the aforesaid seconds ends 7, 8. Subsequent to having softened the wall of the glass tube around annular regions thereof with the aid of said gas flames, mutually oppositely located shaping wheels or prisms 21 are brought to bear against said softened regions (FIG. 4). The shaping wheels are arranged to move against fixed terminal abutments, which determine the depth of the pinched area forming the constrictions 13, 14. The outer ends of the tube are then heated and stems provided with electrodes 15 carried by conductors 16 are fused into said ends in a known manner. A pump pipe 22 is connected to a through channel in the stem 17. This pump pipe is not used until the glass tube is given its final form for assembly to the lamp base 9. The glass tube is purged with inert gas by means of the pump pipes 22, 23, after which one pipe, 23, is melted off. The glass tube is then evacuated and rare gas is introduced into it, until the desired pressure is reached, together with the requisite amount of mercury. The remaining pump pipe, 22, is then melted off and the glass tube is mounted in the lamp base 9 in a known manner, with the aid of a suitable base cement.

It has been found that certain ranges of values for the above described manufacturing parameters are particularly desirable and advantageous.

Specifically, these preferred values include rotating the glass tube in a lathe at a speed in the range of about 15–25 rpm, depending on the diameter and wall thickness of the particular glass tube. The shaping wheels or prisms 21 are preferably made of case iron, have an outer rounded edge of about 1 mm in width, and have a diameter of about 20–25mm. Wheels 21 are mounted as idlers and turn as needed by contact with the driven glass tube. The wheels or prisms 21 are driven into the heated glass to form the constrictions 13, 14 at a speed of about 3–5cm per minute. The heat source or flames 20 are preferably LNG/air mix fuel and are preferably at a temperature of about 1200°–1250° C. at the time the constrictions 13, 14 are formed by wheels or prisms 21. The heated zones of the tube being formed are preferably at a temperature in the range of about 850°–900° C.

After the constrictions are formed, the tube is again heated in preparation for bending in a mold to its final shape. Finally, the necessary steps to apply the fluorescent layer or layers and the seals at the electrodes, and etc., are performed, partially as set forth above and as is known to those skilled in these arts.

The compact low-pressure mercury vapour discharge lamp of the invention has been described herein with reference to its simplest variant, i.e. a lamp which incorporates two mutually parallel tubes. It will be understood, however, that lamps according to the invention may include any number of straight tubes. Since, however, it is of major interest to place the lamp base at entirely one end of the lamp, the lamp must incorporate an even number of straight tubes.

Consequently, the straight tubes are provides with tubes which correspond to the interconnecting tube 4 and which are formed alternately between the ends of two straight tubes lying furthest from the lamp base 9, and the tube ends lying closest to the lamp base. The straight tubes are given a length corresponding to the wattage of the lamp.

While the invention has been described in some detail above; it is to be understood that this detailed description is by way of example only, and the scope of protection granted is to be limited only by the spirit of the invention and the scope of the following claims.

I claim:

1. A method of manufacturing a glass vessel for a compact low-pressure metal vapour discharge lamp, said lamp comprising at least two parallel straight glass tube sections each having a diameter, and an intermediate tube section, each of said straight glass tube sections having a first end and a second end, said intermediate tube section being positioned between said first ends of each of said parallel straight glass tube sections to form a discharge chamber between said first ends of said parallel straight glass tube sections, said lamp having a coating of fluorescent material on the inside surface of said parallel straight glass tube sections, said lamp further including two electrodes located in said discharge chamber with one of said electrodes adjacent to each of said second ends of said parallel straight glass tube sections, comprising the steps of forming constrictions close to each of said second ends of said parallel straight glass tube sections, said constrictions being formed adjacent each of said electrodes respectively, locating said constrictions in each of said parallel straight glass tube sections between said electrode and said first end of each of said parallel straight glass tube sections, thereby defining the length of said discharge chamber extending between said constrictions to be less than the length of said tube sections extending between said electrodes, providing no deformation in said parallel straight glass tube sections adjacent to said electrodes other than said constrictions, said step of forming said constrictions being performed by the substeps of rotating a straight glass tube about its longitudinal axis at a predetermined speed, applying heat of a first predetermined temperature to selected zones of said straight glass tube at which said constrictions are to be formed, raising said first predetermined temperature of said straight glass tube in said zones to a second predetermined temperature, advancing constriction forming means into said heated zones of said rotating straight glass tube at a predetermined speed to thereby form said constrictions, forming said straight glass tube into said parallel straight tube sections and said intermediate tube section.

2. The method of claim 1, configuring said constrictions to a diameter which is less than about half of the diameter of said parallel straight tube sections; an when calculated between said constrictions and said first ends of said parallel straight tube sections, each of said parallel straight tube sections having a length between 10 and 25 times the diameter of said parallel straight tube sections, whereby said electrodes remain operationally serviceable for at least 15,000 hours of operation.

3. A method of manufacturing a glass tube for a compact low-pressure metal vapour discharge lamp using straight glass tubes, said lamp being of the type which has a coating of fluorescent material on the inside surface of said glass tubes and which has two electrodes located one each in the furthest apart ends of the discharge chamber formed inside said tubes, comprising the steps of forming constrictions in said furthest apart ends of said glass tubes at regions adjacent each of said electrodes respectively, locating said constrictions in said glass tubes to that side of each electrode opposite each end of the tube to thus define the length of said discharge chamber between said constrictions to be less than the length of said tubes between said electrodes, providing no deformation in said straight glass tubes in the vicinity of said electrodes other than said constrictions, said step of forming said constrictions being performed by the sub-steps of rotating said straight glass tube about its longitudinal axis at a predetermined speed, applying heat at a first predetermined temperature to the zones of said glass tube at which said constrictions are to be formed, raising the temperature of the glass tube in said zones to a second predetermined temperature, and advancing constriction forming means into said heated zones of said rotating glass tube at a predetermined speed to thereby form said constrictions.

4. The method of claim 3, and providing abutment means to halt said advance of said constriction forming means to thereby control the depth of said constrictions.

5. The method of claim 3, configuring said constrictions so that the diameter of said constrictions is less than about half of the diameter of said straight tube; and when calculated between the constrictions and the tube ends furthest from the lamp base, the length of said straight tube is between 10 and 25 times the diameter of the tube, whereby said electrodes remain operationally serviceable for at least 15,000 hours of operation.

6. The method of claim 3, selecting said predetermined speed of rotation of said glass tube in the range of about 15-25 rpm.

7. The method of claim 3, selecting said first predetermined temperature in the range of about 1200°-1250° C.

8. The method claim 3, selecting said second predetermined temperature in the range of about 850°-900° C.

9. The method of claim 3, selecting said predetermined speed of advance of said constricting forming means into said heated zone in the range of about 3-5 cm per minute.

10. The method of claim 9, selecting said constriction forming means to be cast iron wheels, mounting said wheels as idlers, and selecting the configuration and dimensions of said wheels to have a rounded outer edge of about 1 mm width and a diameter in the range of about 20-25 mm.

* * * * *